United States Patent

[11] 3,621,288

[72] Inventor Stewart C. Brown
Woodland Hills, Calif.

[21] Appl. No. 856,992
[22] Filed Sept. 11, 1969
[45] Patented Nov. 16, 1971
[73] Assignee Xerox Corporation
Stamford, Conn.

[54] MULTICHANNEL SWITCHING SYSTEM WITH UNITY-GAIN ISOLATION AMPLIFIER OPERATIVELY CONNECTED BETWEEN THE SELECTED CHANNEL AND REMAINING OPEN CHANNELS
6 Claims, 1 Drawing Fig.

[52] U.S. Cl. .......... 307/243, 307/251, 328/104, 328/154
[51] Int. Cl. .......... H03k 17/16, H03k 17/56
[50] Field of Search .......... 328/104, 154; 307/243, 251

[56] References Cited

UNITED STATES PATENTS

| | | | |
|---|---|---|---|
| 2,836,734 | 5/1958 | Cichanowicz | 307/243 X |
| 2,906,869 | 9/1959 | Kramskoy | 328/154 X |
| 3,135,873 | 6/1964 | Werme | 307/243 X |
| 3,135,874 | 6/1964 | Lucas et al. | 307/243 |
| 3,284,766 | 11/1966 | Sterry | 307/243 X |
| 3,524,138 | 8/1970 | Kasson | 328/104 |

*Primary Examiner*—John S. Heyman
*Attorney*—Smyth, Roston & Pavitt

ABSTRACT: A multiplexer for low-level signals is disclosed wherein each channel has two FETs in series. A unity gain signal from an isolation amplifier for the current signal is fed through a resistor to junctions of FETs in each channel. The turnoff bias for the FETs varies in synchronism with that signal.

PATENTED NOV 16 1971 3,621,288
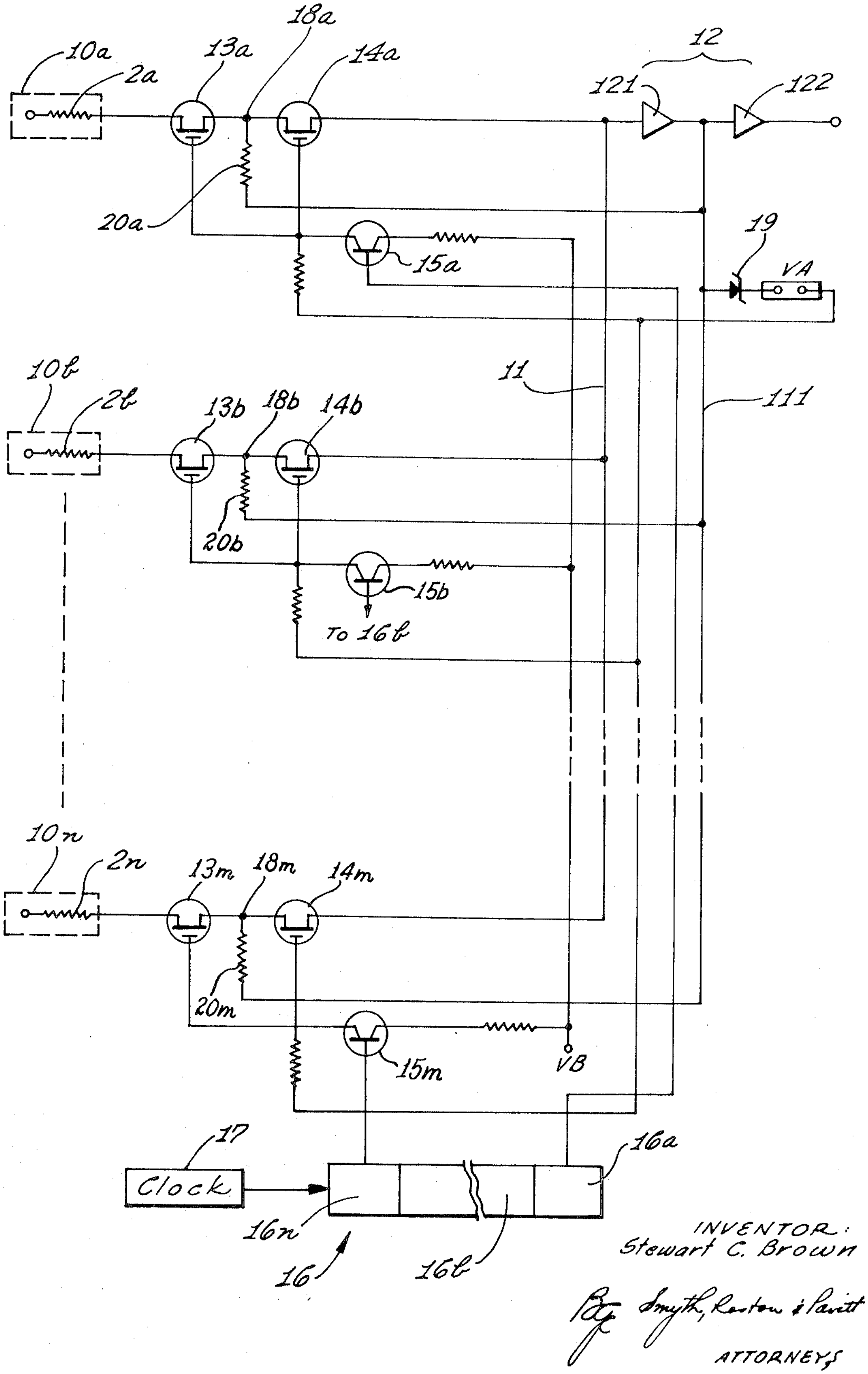
INVENTOR:
Stewart C. Brown
By Smyth, Roston & Pavitt
ATTORNEYS

MULTICHANNEL SWITCHING SYSTEM WITH UNITY-GAIN ISOLATION AMPLIFIER OPERATIVELY CONNECTED BETWEEN THE SELECTED CHANNEL AND REMAINING OPEN CHANNELS

The present invention relates to improvements in data acquisition circuits and more particularly to circuits for collecting a plurality of analog signals from different sources, on a time-sharing basis. Circuits of this type usually employ a multiplexing circuit which connects the input of an amplifier to the several analog signal sources, one at a time, either cyclically sequentially or in accordance with any other pattern. The multiplexer includes a plurality of switches to connect its output channel to the signal sources whereby one of these switches is closed at any instant, to connect one signal source to the amplifier input, while the other switches for the other sources are open. Opening and closing the switches is controlled in accordance with the desired multiplexing pattern for time sharing of the common acquisition amplifier by all of the analog signal sources.

For reasons of speed the switches are electronic switches, usually semiconductor devices. The term "open" and "-closed" for such a "switch" are actually used rather loosely as the semiconductor is controlled between a conductive and a nonconductive state. Moreover, "nonconductive" is still not sufficiently accurate as the control is actually between a high impedance state, when the semiconductor is regarded as nonconductive and the switch it represents is regarded as open, and a low-impedance state when the semiconductor is conductive and the switch is regarded as being closed.

Considering the foregoing, it appears that the amplifier input is connected at any instant to one signal source through a low-impedance semiconductor device and to all other signal sources through high impedance devices. Thus, the "disconnected" signal sources effectively apply their signals in parallel to the amplifier input through the high impedances of nonconductive semiconductor devices. Obviously, the more there are of such sources, the higher will be the resulting parasitic input superimposed upon the desired input at the amplifier input. This will be particularly so if one considers that the several sources may provide signal amplitude at different amplitude ranges. Many "disconnected" high amplitude sources may thus materially distort the input as provided by a connected low-level source.

Additionally, it has to be considered that a semiconductor switch usually has an inherent capacitance which is particularly effective in the nonconductive state. The capacitances of the several multiplexing switches appear effectively connected in parallel to the amplifier input and thus reduce the response of the amplifier to the desired input signal. This is particularly effective in case the multiplexing rate is very high and the settling time for any input becomes a limiting factor as far as operational speed is concerned. This settling time is enlarged by these parasitic capacitances.

It is, therefore, and object of the present invention to overcome these deficiencies and to improve the multiplexing operation of a data acquisition circuit so that those multiplexer input channels having signal sources supposedly disconnected from the common output channel (amplifier input) do not disturb the signal of the connected source. In accordance with the invention, it is suggested to provide and isolation amplifier of unity gain having input connected to the multiplexer output and having its output operatively connected to the "open" switches to control suppression of the inputs of the nonconnected sources in synchronism with the desired signal. The isolation amplifier may be a portion of the principal amplifier in which an internal stage is tapped having unity gain relation to the overall amplifier unit.

In particular, the multiplexing switches in each signal channel include two semiconductor devices, for example, field effect transistors or FET's for short, connected in series to each other, to the respective signal source and to the amplifier input bus. An intermediate point of these two FET's, such as a common junction, is connected through a resistor to the output of that isolation amplifier. This resistor has a resistance high in relation to the low impedance for the conductive FET as well as in relation to the internal resistance of the signal source, but low in relation to the impedance effective as leakage resistance of a nonconductive FET. The parasitic influence of that channel for nonconductive FET's is now attenuated at the divider ratio of that resistance to the leakage resistance of the FET. The second FET of each channel isolates the junction thus referred to from the common multiplexer output channel. In addition or in lieu thereof, the turning of bias for the FET's is caused to change level in synchronism with the isolation amplifier output so that the parasitic, inherent capacitance of the FET's are effectively taken out of the circuits as the signal level across them vary in unison.

While the specification concludes with claims particularly pointing out and distinctly claiming the subject matter which is regarded as the invention, it is believed that the invention, the objects and features of the invention and further objects, features and advantages thereof will be better understood from the following description take in connection with the accompanying drawings in which:

The FIG. of the drawing illustrates a circuit diagram, partially as block diagram, of the preferred embodiment of the invention.

Proceeding now to the detailed description of the drawings, the FIG. illustrates a plurality of measuring channels identified by suffix or test points 10*a*, 10*b*,...10*n*. Each of these channels identified by suffixes *a*, *b*, etc. through *n* is represented by a terminal serving as the source of a measuring potential. The several measuring channels may pertain to measuring instruments and probes such as thermocouples, piezoelectric pressure transducers etc. In the general case, these instruments and channels are independent from each other though mutual dependency, directly or indirectly, is not to be excluded.

Each instrument and channel is furthermore represented by an internal resistance, which are resistances *ra*, *rb*,..., *rn*. These resistances are in parallel to each other, each being as effective as an input resistor for the acquisition circuit improved in accordance with the present invention. Generally, these resistances are in the range of 1 kilohm or thereabouts.

All of the measuring channels 10*a*, 10*b*,..., 10*n* are connected as individual signal sources to an input bus 11 for an operational amplifier assembly 12. As to this connection, resistor 2*a*, 2*b*,..., 2*n* are connected in series to bus 11. The connection between signal sources and bus 11 is not a direct or permanent one but runs through switching elements operated for multiplexing so that only one measuring channel at a time has (or should have) control over the input of amplifier 12. In particular a measuring channel 10*x* ($x$=$a$, $b$,..., $n$) is connected in series with a first FET 13*x* which in turn is connected in series with a second FET 14*x*. There are accordingly first FET switches 13*a*, 13*b*,..., 13*n*, and second FET switches 14*a*, 14*b*,..., 14*n*.

For a channel 10*x* to be connected to input bus 11 of amplifier 12 both associated FET's 13*x* and 14*x* must be conductive. The gate electrodes of such a pair of FET's are interconnected and under control of a transistor 15*x* ($x$=$a$, $b$,..., $n$), which transistor in turn is under control, for example, of one state of a recycling shift register 16, having stages 16*a*, 16*b*,..., 16*n* accordingly. The register is operated by a shift clock 17 at a cycle rate which is equal to the shift clock rate divided by the number of channels (register stages).

It should be noted that the particular multiplexing pattern is not of concern for the present invention. Therefore, a simple sequential cycling as provided by a recycling shift register is just a convenient example for explaining the invention. Other multiplexing patterns are conceivable; the channels can be connected to the amplifier on a priority demand basis. In another case, some channels may vary their outputs and measuring signals at a higher rate than others and they may be connected to the amplifier input more frequently.

For a channel to be disconnected from amplifier 12, the respective transistor 15*y* ($y$=$a$, $b$,... $x-1$, $x+1$,...$n$) is nonconductive, and cutoff bias from a source $V_A$ prevails in the gate electrodes of FET's 13$y$ and 14$y$. When the energized state of a stage of 16$x$ ($x$=$a, b,..., n$) of shift register 16 renders the associated transistor 15$x$ conductive, bias voltage from a source $V_B$ is applied to the gates of one pair of FETs 13$x$ and 14$x$, turning them on, to thereby connect source 10$x$ to bus 11.

The preceding paragraph states the desired state of operation; however, it must be observed that turning on and turning off of the several FET's in effect means merely controlling them to exhibit a relatively low resistance or a relatively high resistance. Thus, during operation one of the measuring channels, for example channel 10$a$, is connected to the bus through a pair of low resistance FET's, and all of the remaining channels connect in parallel also that bus 11, but through high resistance FET's. In order to offset the effect of a possibly large number of parasitic voltages as provided to the amplifier input at any instant by all of these supposedly disconnected channels, the following additional circuit is provided.

There are junctions 18$a$, 18$b$,..., 18$n$ for each interconnected pair of FET switches in each signal channel, and these junctions are respectively connected to resistors 20$a$, 20$b$,..., 20$n$. The resistance of each resistor 20$x$ ($x$=$a, b,..., n$) is high in comparison with the internal resistance $ra, rb,..., rn$ of the respective signal source but low in comparison with the leakage resistance of the FET switches when high Ohmic for nonconduction For example, the resistance of a resistor 20$x$, may be in the order of 100 kilohms, the leakage resistance of an FET being 100 megaohm or there abouts.

The amplifier 12 is divided into a prestage 121 providing unity gain to an output bus 111 in representation of any input signal applied to its input terminal which is also the input (bus 11) of the amplifier assembly as a whole. In addition, there is a main or principal or power amplifier 122 which is cascaded to prestage 121. Stage 122 provides the output proper of amplifier 12. Stage 121 is in effect an isolation amplifier which is not necessarily included in the amplification system 12 but it is convenient to so do.

The respective other side of the resistor 20$x$ ($x$=$a, b, ...., n,$), not connected junctions 18$x$, connect to output bus 111 of unity gain, signal isolation stage 121. Bus 111, therefore, receives a signal, the amplitude of which is equal to the signal amplitude as derived from the currently effective signal and measuring channel, but which is separate from that current input signal source. All of these resistors 20$a$, 20$b$,..., 20$n$are connected to that internal unity-gain output in bus 111 so that the potential thereof varies uniformly in accordance with the input signal as applied at any instant to operational amplifier 12. This establishes a particular feedback, the effect of which will now be considered in detail.

Take first a channel not connected to the amplifier input, i.e., a channel in which the respective FET switches 13$x$, 14$x$ are highohmic. A signal source not connected at any instant to the operational amplifier still drives a current through the leakage resistance of the first open switch 13$x$, in voltage divider configuration with the respective resistor 20$x$ connecting the junction 18$x$ to unit gain output bus 111.

Let it be assumed that channel 10$b$ is one of the currently disconnected channels. It appears, therefore, that as far as a signal in channel $b$ is concerned, signal source 10$b$ provides a voltage to junction 18$b$ which is attenuated at a ratio equal to the ratio of the leakage resistance of the "open" switch 13$b$ to the bleeder resistance 20$b$ connecting that junction 18$b$ to unit gain output terminal or bus 111. The parasitic driving voltage is more particularly the instantaneous difference between the desired input signal as derived from the one channel whose switching FET's are conductive via bus 111, and the particular voltage provided by the currently parasitic channel, for example, channel 10$b$. It is, of course, that difference which may interfere with proper operation. That difference may incidentally be zero or vary in unison with the desired input but that does not represent the general case. A parasitic nonzero difference, however, is drastically attenuated at junction 18$b$. The attenuation produced for each parasitic input may, for example, be 1,000:1.

The second FET 14$b$ is needed to separate the attenuated parasitic signal from input bus 11. Of course, the high impedance of that nonconductive FET provides further current attenuation. Therefore any leakage current in the common signal bus 11 feeding the input terminal of the operational amplifier 12 is thousandfold reduced, or to state it differently, thousand signal sources (there are never that many) provide parasitic influence equal only to that of a single channel without the inventive improvement in the switching system, and that influence is, of course, equal to the ratio of FET resistance in the conductive and in the nonconductive state.

Now the connected channel has to be considered. Assume this to be channel $a$, then the two FET's 13$a$ and 14$a$ are conductive. The signal of source 10$a$ is applied to junction 18$a$, once directly and again through resistor 20$a$. Thus there is practically no voltage across that resistor, and as a consequence this particular feedback is not effective at all in the channel which is operated and controls the amplifier input at any instant.

The multiplexer arrangement is improved additionally in order to consider the fact that an electronic switch, such as a FET, when nonconductive has a very high, effective capacitance. This capacitance is particularly effective between its gate electrode on one hand, and source and drain electrodes of the FET on the other hand. It appears further that these capacitances of all the respective nonconductive FET switches in the several supposedly nonconnected channels are effectively connected directly in parallel to each other and to the common input signal line bus 11. As stated above, an input when newly applied to amplifier 12 has to settle before it is usable, an that settling time has to elapse before multiplexing can proceed. These capacitances provide material response delay for the operating input signal and, therefore, reduce the multiplexer speed.

The multiplexer is now improved in such a manner that the turnoff voltage $V_A$ applied to each of the several FET's to render them nonconductive, is referenced against the unity gain output line of the operational amplifier portion 121 which follows the signal variation faithfully. A signal isolating Zener diode 19 is interposed between the biasing source $V_A$ as established by the nonconductive FET switches, are connected between the unity gain output line 111 and the input line or bus 11 of the operational amplifier which is under control of the one channel whose FET's are conductive. Signal voltage in these lines 11 and 111 vary in phase and in unison. Thus, the capacitances of the nonconductive FET's receive equal signal amplitudes on both sides of their "capacitor electrodes" and, therefore, they actually disappear from the circuit.

The invention is not limited to the embodiments described above but all changes and modifications thereof not constituting departures from the spirit and scope of the invention are intended to be included.

I claim:

1. In a multiplexing circuit having a plurality of input channels to be connected, one at a time, to the input terminal of an amplifier, the combination comprising:

first means connected to the amplifier input terminal and providing a unity gain signal faithfully following the current input signal but in signal isolation from the amplifier input;

a plurality of electronic switching means one for each channel and individually biased for conduction or nonconduction to connect the respective channel serially to or disconnect it from the input terminal of the amplifier; and circuit means connected to the first means for individually controlling the electronic switching means of the plurality which are in the nonconductive state in synchronism with the input signal as provided through the one switching means of the plurality which is, in the conductive state, to the amplifier input terminal, to attenuate parasitic influences of the nonconductive switching means upon the effective current input for the amplifier.

2. In a circuit as set forth in claim 1, the electronic switching means for each channel including a pair of semiconductor devices, connected serially to each other and between the channel and the input terminal of the amplifier, the circuit means including a plurality of resistors one for each channel and having value high to the internal resistance of the respective input channel but low to the leakage resistance of the semiconductor devices. The resistor connected to a junction between the semiconductor devices of the respective pairs so that the voltage difference between the effective input for the amplifier and the input of a channel whose semiconductor devices are nonconductive, is attenuated by the ratio of effective resistance of one of the nonconductive semiconductor devices and the resistance of the resistor connected thereto, said attenuated signal effective across the other nonconductive semiconductor device of the pair.

3. In a multiplexing circuit having a plurality of input channels to be connected in sequence or in accordance with a particular pattern to the input terminal of an amplifier, the combination comprising:

means connected to the amplifier input terminal and providing a unity gain signal but in signal isolation from the input terminal;

a plurality of pairs of electronic semiconductor switches, the switches of each pair connected in series to each other and between an input channel of the plurality and of the amplifier input terminal there being a point intermediate the two switches of a pair;

second means for operating the switches in a pattern or in sequence to render the switches of a pair of the plurality conductive for the signal of the respective input channel to pass through the switches of the pair and the intermediate point, while causing the remaining switches to stay nonconductive; and resistive means including a plurality of resistors for respectively connecting the point intermediate the two switches of each pair to the output of the first means, so that a difference in signal between the input of a channel connected to a pair of nonconductive switches of the plurality, and the unity gain signal is attenuated at the ratio of the resistance of one of the switches of the pair to the resistance of the resistor of the plurality connected to the intermediate point between the switches of the pair, and the attenuated signal being effective across the other switch of the pair.

4. In a multiplexing circuit having a plurality of input channels to be connected, one at a time, to the input of an amplifier combination comprising:

first means connected to the amplifier input providing a unity gain signal faithfully following the current input signal but in signal isolation from the amplifier input;

electronic switching means in each channel individually biased for conduction or nonconduction to respectively connect the respective channel to or disconnect it from the input of the amplifier and including means for providing offbias potential to a control input of the switching means; and second means for connecting the offbias potential means to the first means to cause the offbias to vary in synchronism with currently effective input for the amplifier, so that the voltage between the control input of the switching means and the output of the switching means remains substantially independent from variations of the currently effective input for the amplifier.

5. In a circuit as in claim 1, the electronic switching means for each channel including a pair of field effect transistors serially connected to each other with respective two main electrodes, while the respective other two main electrodes connect to the respective channel and the input terminal of the amplifier, the circuit means including a plurality of resistors, all being connected to the first means to receive the unity gain signal, each being additionally connected to the serially connected main electrodes of a pair of the plurality, the resistors having resistance intermediate the resistance of the field effect devices in the conductive state and in the nonconductive state.

6. In a circuit as in claim 1, each switching means connected to a source providing offbias, the source connected to the first means to obtain variation in the potential level as provided by the offbias to the switching means in synchronism with the unit gain signal.

* * * * *